(12) United States Patent
Milekic

(10) Patent No.: US 7,561,143 B1
(45) Date of Patent: Jul. 14, 2009

(54) USING GAZE ACTIONS TO INTERACT WITH A DISPLAY

(75) Inventor: Slavoljub Milekic, Philadelphia, PA (US)

(73) Assignee: The University of the Arts, Philadelphia, PA (US)

( * ) Notice: Subject to any disclaimer, the term of this patent is extended or adjusted under 35 U.S.C. 154(b) by 862 days.

(21) Appl. No.: 11/078,928

(22) Filed: Mar. 11, 2005

Related U.S. Application Data

(60) Provisional application No. 60/554,786, filed on Mar. 19, 2004.

(51) Int. Cl.
*G09G 5/00* (2006.01)
(52) U.S. Cl. .......................................... 345/156; 345/32
(58) Field of Classification Search ......... 345/156–158, 345/7, 8, 32; 351/209, 210; 715/700; 382/117
See application file for complete search history.

(56) References Cited

U.S. PATENT DOCUMENTS

| | | | | |
|---|---|---|---|---|
| 5,517,021 | A * | 5/1996 | Kaufman et al. | 250/221 |
| 5,886,683 | A * | 3/1999 | Tognazzini et al. | 715/700 |
| 6,204,828 | B1 * | 3/2001 | Amir et al. | 345/7 |
| 6,351,335 | B1 * | 2/2002 | Perlin | 359/618 |
| 6,421,064 | B1 * | 7/2002 | Lemelson et al. | 345/688 |
| 6,437,758 | B1 * | 8/2002 | Nielsen et al. | 345/8 |
| 6,608,615 | B1 * | 8/2003 | Martins | 345/156 |
| 6,637,883 | B1 * | 10/2003 | Tengshe et al. | 351/210 |
| 2002/0105482 | A1 * | 8/2002 | Lemelson et al. | 345/7 |
| 2002/0180799 | A1 * | 12/2002 | Peck et al. | 345/784 |
| 2003/0020755 | A1 * | 1/2003 | Lemelson et al. | 345/786 |
| 2004/0174496 | A1 * | 9/2004 | Ji et al. | 351/209 |
| 2005/0047629 | A1 * | 3/2005 | Farrell et al. | 382/117 |
| 2005/0108092 | A1 * | 5/2005 | Campbell et al. | 705/14 |

OTHER PUBLICATIONS

U.S. Appl. No. 09/096,950, filed Jun. 21, 1998, Milekic.
Eye Movement Equipment Database http://ibs.derby.ac.uk/emed.
Qiang and Zhiwei, "Eye and Gaze Tracking for Interactive Graphic Display", International Symposium on Smart Graphics, Jun. 11-13, 2002, Hawthorne, NY (2002).
Vertegaal, R."The GAZE groupware System: mediating joint attention in multiparty communications and collaboration", Proceedings of the ACM CHI'99 Human Factors in Computing Systems, ACM Press, New York 1999, pp. 294-301.
Jacob, R.J.K., "Eye-movement-based human-computer interaction techniques: Toward non-command interfaces", in H.R. Hartson & D. Hix (eds.) Advances in Human-Computer Interaction, vol. 4, pp. 151-190, Ablex Publishing Corporation, Norwood, New Jersey 1993.

(Continued)

*Primary Examiner*—Ricardo L Osorio
(74) *Attorney, Agent, or Firm*—Gordon E. Nelson

(57) ABSTRACT

Techniques for using gaze actions to interact with interactive displays. A pointing device includes an eye movement tracker that tracks eye movements and an eye movement analyzer. The eye movement analyzer analyzes the eye movements for a sequence of gaze movements that indicate a gaze action which specifies an operation on the display. A gaze movement may have a location, a direction, a length, and a velocity. A processor receives an indication of the gaze action and performs the operation specified by the gaze action on the display. The interactive display may be digital or may involve real objects. Gaze actions may correspond to mouse events and may be used with standard graphical user interfaces.

26 Claims, 11 Drawing Sheets

OTHER PUBLICATIONS

Zhai, S.; Morimoto, C.; Ihde, S.; "Manual and Gaze Input Cascaded (MAGIC) Pointing", Proceedings of the CHI'87, ACM New York, 1999, pp. 246-253.

Glenstrup, A.J., Engell-Nielsen, T. "Eye Controlled Media: Present and Future State", Minor Subject Thesis, DIKU, University of Copenhagen, 1995 http://www.diku.dk/ panic/eyegaze/article.htm#contents.

Glenn III, F.A.; Iavecchia, H.P.; Ross, L.V.; Stokes, J.M.; Weiland, W.J.; Weiss, D.; Zakland, A.L. "Eye-voice-controlled interface", Proceedings of the Human Factors Society, 1986, pp. 322-326.

Jacob, R.J.K.; Karn, K.S., "Eye Tracking in Human-Computer Interaction and Usability Research: Ready to Deliver the Promises (Section Commentary)", The Mind's Eyes: Cognitive and Applied Aspects of Eye Movements, J. Hyona, R. Racach, H. Duebel (eds), Oxford, Elsevier Science, 2003.

* cited by examiner

205

203

201

207

USING GAZE ACTIONS TO INTERACT WITH A DISPLAY

CROSS REFERENCES TO RELATED APPLICATIONS

The present patent application claims priority from U.S. provisional patent application 60/554,786, S. Milekic, Intention-based interface using gaze tracking, filed Mar. 19, 2004. That provisional patent application is incorporated by reference into the present patent application.

BACKGROUND OF THE INVENTION

1. Field of the Invention

The invention relates generally to user interfaces for interacting with objects in a display and more particularly to user interfaces in which eye movement is used to control a pointing device and thereby to interact with the objects in the display.

2. Description of Related Technology

The following Description of related technology first describes techniques that are currently used to track eye movements and then provides examples of how eye movement has been used to interact with objects in a display.

Eye Tracking Apparatus: FIG. 1

Studies that have involved eye and gaze tracking have been carried out since the second half of the 19$^{th}$ century. The techniques used to track eye movements were revolutionized by the development of digital computers. Personal computers have now become fast enough to do digital video analysis of eye movements in real time. The most commonly used approach in video-based eye tracking is to calculate the angle of the visual axis (and the location of the fixation point on the display surface) by tracking the relative position of the pupil and a speck of light reflected from the cornea, technically known as the "glint". FIG. 1 shows how this is done. The gaze direction is calculated by comparing the relative position and relationship between the pupil 103 and corneal reflection—the glint 107. Infra-red illumination of the eye produces the 'bright pupil' effect 105 and makes the tracking easier.

A typical, and portable, eye tracking system similar to ones that are commercially available is shown at 109. System 109 is a laptop computer 111 to which two infrared illuminators and a video camera have been added. Shown on screen 117 is the picture of the eye made by camera 117 with crosshairs marking the positions of the pupil and the glint as determined by the digital video analysis of the picture of the eye. Further information about equipment for tracking eye movement may be found in the Eye Movement Equipment Database, available on the World Wide Web at ibs.derby.ac.uk/emed/.

It is becoming possible to build eye trackers whose prices are comparable to the price of a new personal computer. Most commercially available eye tracking systems (including the high-end ones) have two characteristics that make them less than ideal for many applications. These are:

the system has to be calibrated for each individual user;
even remote eye trackers have very low tolerance for head movements and require the viewer to hold the head unnaturally still, or to use external support like head- or chin rests.

The solution lies in the development of software that would be able to perform eye tracking data analysis in more natural viewing circumstances. A recent report by Quiang and Zhiwei, "Eye and Gaze Tracking for Interactive Graphic Display", *International Symposium on Smart Graphics*, Jun. 11-13, 2002, Hawthorne, N.Y., (2002) seems to be a step in the right direction. Instead of using conventional approaches to gaze calibration, they introduce a procedure based on neural networks that incorporates natural head movements Pointers and Pointing Devices in Graphical User Interfaces Pointers are essential components of modern graphical user interfaces (GUIs). A pointer is a graphic such as an arrowhead that indicates a current position on an interactive device's display. A pointing device is the device that a user of the interactive device uses to move the pointer and to interact with the objects in the display. A pointing device may be any device which translates a movement made by a user of the pointing device into a movement of the pointer and/or an indication of an operation to be performed on the object. The pointing device generally has two parts: tracking hardware which maps some movement of the user onto positions in the display and indicates the current position of a switch on the tracking hardware, and software which is particular to the application which is receiving the hardware inputs and interprets the current display and switch positions as required by the application. Pointing devices in current use include the mouse, the trackball, the stylus, a touch-sensitive area on the keyboard, the joystick, including a miniature joystick built into a keyboard, and a touch-sensitive surface over the display. The mouse provides an example of how pointing devices generally work. Objects in the display include icons representing entities such as documents. To view a document, the user causes the pointing device to move the pointer until it is over the icon that represents the document. Then the user performs an action which indicates that the object represented by the icon is to be opened. In the case of the standard mouse, that action is a double click with the left-hand mouse button. In response to the double click, the interactive system causes a word processing program to be executed which opens the document. As can be seen from the foregoing, the pointing device operates in two modes: a navigational mode, in which it moves the pointer to an object of interest, and an operational mode, in which it performs an action on the object of interest, in this case opening the document. With the mouse and with most other pointing devices, the user uses a button on the pointing device to switch between the navigational and operational modes.

Other common operations on objects are dragging the object, which is done by depressing the left-hand button of the mouse and moving the mouse, which causes the object to move as indicated by the mouse, and dropping the object, which is done by ceasing to depress the left-hand button when an object is being dragged. Other operations are of course possible. One example is the throwing operation described in U.S. Ser. No. 09/096,950, Milekic, User interface for removing an object from a display, filed Jun. 12, 1998. Throwing is an extension of the operation of dragging an object. As long as the speed of dragging remains within a certain limit one can move an object anywhere on the screen and drop it at desired location. However, if the speed of the motion increases above a threshold, the object flies off the display (most often, to be replaced by another object).

Pointing Devices that Employ Eye Movement to Move the Pointer

In the mid-1980's, researchers began experimenting with pointing devices that employed eye movement to control the pointer and interact with the display. The focus was mostly on users with special needs. Promoted by rapid technological advancements, this trend continued and in the past decade a substantial amount of effort and money has been devoted to the development of eye- and gaze-tracking mechanisms for human-computer interaction. Such pointing devices can be made using eye movement tracking devices such as the one shown at 109 in FIG. 1. When used with pointing devices, modern eye trackers map a current gaze direction that falls within a display to a cursor location in the display. Depending on the hardware, the tracker updates the current cursor location 30-200 times a second. The stream of current cursor locations is provided to software, which interprets the movements of the cursor. In the following, the generic term eye movement information is used to indicate the stream of cursor locations or any other information received from the eye tracker which can be used to determine eye movements.

For details of the experiments with pointing devices that employ eye movement, see Vertegaal, R. "The GAZE groupware system: mediating joint attention in multiparty communication and collaboration, in *Proceedings of the ACM CHI'99 Human Factors in Computing Systems*, ACM Press, New York, 1999, pp 294-301; Jacob, R. J. K. "Eye-movement-based human-computer interaction techniques: Toward non-command interfaces", in H. R. Hartson & D. Hix, (eds.) *Advances in Human-Computer Interaction*, Vol. 4, pp 151-190, Ablex Publishing Corporation, Norwood, N.J., 1993; or Zhai, S., Morimoto, C., Ihde, S. "Manual and Gaze Input Cascaded (MAGIC) Pointing", *Proceedings of the CHI'87*, ACM New York, 1999, pp. 246-253

Problems with Using Eye Movements to Control a Pointing Device

The biggest problem with using eye movements to control a pointing device is switching between modes. One aspect of this problem is that the eye movements occur not only when the user wishes to control the pointing device, but also when the user is simply looking at the display. The pointing device must thus be able to distinguish between observational eye movements, which occur when the user is just looking at the display, and intentional eye movements, which occur when the user wants to perform an operation in the display. A pointing device that is controlled by eye movements must thus distinguish between three modes of operation: the observational mode, in which the user is simply observing the display, in addition to the navigational and operational modes.

The mode problem is exacerbated by the fact that it is not immediately obvious how an eye movement can be interpreted as causing a shift from one to the other of the modes. Put another way, there are no buttons on a pointing device that is controlled by eye movements, and consequently, one can't indicate a mode switch by pushing a button. In the following, the problem of indicating a mode switch in a pointing device that is controlled by eye movements will be termed the "switch" problem. In the literature concerning pointing devices controlled by eye movements, the problem is known as the "Midas touch" or the "clutch" problem. The problem has been addressed numerous times in the literature and there are many proposed technical solutions. Only a few illustrative examples will be presented here.

One of the solutions to the switch problem, developed by Risø National Research Laboratory, was to separate a first area of the display in which the pointing device was always in operational mode from a second area of the display that contained the observed object. When the user looked at the first area, the result was the performance of the operation of putting the pointing device in operational mode when the user looked at the observed object. The first area thus served as a mode switch for the second area. In the following, an area of a display in which a pointing device may be switched into operational mode is termed a gaze sensitive area. An example of this technique is shown at 201 in FIG. 2. The area that is always gaze sensitive is button 205, termed an "EyeCon" button. The object that may become gaze sensitive is drawing 203. When the user focuses on button 205 (ordinarily for half a second), the button 'acknowledges' the viewer's intent to interact with object 203 by going through the animated sequence shown at 207. The completely closed eye indicates that the observed object is now gaze sensitive. For details on this approach, see Glenstrup, A. J., Engell-Nielsen, T. *Eye Controlled Media: Present and Future State*. Minor Subject Thesis, DIKU, University of Copenhagen, 1995, available at: http://www.diku.dk/~panic/eyegaze/article.html#contents One of the problems with this technique comes from the solution itself—the solution separates selection and action. In order to make object 203 gaze sensitive, one has to stop looking at the object and look at EyeCon button 205. Another problem is the interruption of the flow of interaction—in order to make object 203 gaze sensitive, the user has to focus on the action button for a period of time. This undermines the unique quality of gaze direction as the fastest and most natural way of pointing and selection. Another solution to the same problem (with very promising results) was to use inputs other than eye movements for the switch: the voice, as described in Glenn III, F. A., Iavecchia, H. P., Ross, L. V., Stokes, J. M., Weiland, W. J., Weiss, D., Zakland, A. L. Eye-voice-controlled interface, Proceedings of the Human Factors Society, 1986, pp. 322-326 or manual input, as described above in the Zhai reference. The difficulty here, of course, is that there may be applications in which such separate channels for the switch are not available to the user.

The second major problem with the use of eye movements to interact with objects in a display is the sheer volume of data collected during eye tracking and the effort involved in doing meaningful analysis of the data. Individual fixations of the eyes on an object carry very little meaning on their own. Consequently, a wide range of eye tracking metrics has been developed in past 50 years. An excellent and very detailed overview of these metrics can be found in Jacob, R. J. K., Karn, K. S. "Eye Tracking in Human-Computer Interaction and Usability Research: Ready to Deliver the Promises (Section Commentary)", in *The Mind's Eyes: Cognitive and Applied Aspects of Eye Movements*, J. Hyona, R. Radach, H. Deubel (Eds.), Oxford, Elsevier Science, 2003. Here, we will mention only a few metrics that may be used to infer the viewer's interest or intent:

number of fixations: a fixation is the brief period of time during which the eye does not move. Concentration of a large number of fixations in a certain area may be related to user's interest in object or detail presented in that area when viewing a scene (or a painting).

gaze duration: gaze is defined as a number of consecutive fixations in an area of interest. Gaze duration is the total of fixation durations in a particular area.

number of gazes: is probably a more meaningful metric then the number of fixations. Combined with gaze duration, it may be indicative of viewer's interest.

scan path: scan path is a line connecting consecutive fixations. It can be revealing of a viewer's visual exploration strategies and is often very different in experts and novices.

As is apparent from the foregoing, using eye movements to interact with an object requires good solutions to the switch problem and to the problem of what metrics to use in measuring and analyzing eye movement. It is an object of the invention disclosed herein to provide techniques for using eye movements to interact with objects which offer good solutions to those problems. It is further an object of the invention disclosed herein to provide improved techniques for solving problems similar to the switch problem in other pointing devices that do not include buttons.

SUMMARY OF THE INVENTION

In one aspect, the invention is a method of interacting with a display. The method is performed using eye movement information received from an eye movement tracker and includes the steps of analyzing the eye movement information for gaze movements that indicate a gaze action which specifies an operation on the display and when there is such a gaze action, performing the specified operation. The analysis may be based on the location and direction of the gaze movements, the length of a gaze movement, or the velocity of the gaze movement. The operation specified by the gaze action may be on an object in the display. The object in the display may belong to a graphical user interface and the operation may be an operation in the graphical user interface.

The method may further include the step of analyzing the eye movement information to determine whether the eye movements are in a gaze-sensitive area in the display. When they are, the gaze-sensitive area may change its appearance to indicate that a gaze action may be performed. The change of appearance may also indicate a set of operations that can be performed on the display, and the method may further include performing one of the operations in the set when the eye movements indicate selection thereof.

There may further be a set of operations in the display that has a subset, with the velocity of an eye movement in a gaze action determining whether the gaze action specifies an operation belonging to the subset.

In another aspect, the invention is a pointing device that includes an eye movement tracker and an eye movement analyzer. The eye movement tracker tracks eye movements of a viewer of the display and produces eye movement information from the eye movements. The eye movement analyzer analyzes the eye movement information for gaze movements that indicate a gaze action that specifies an operation in the display. When there are such gaze movements, the pointing device provides a specification of the operation to a processor.

In a further aspect, the invention is a method employed in an interactive device which has a processor, a display controlled by the processor, and a pointing device to which the processor responds. The pointing device is capable of moving a pointer in the display at varying velocities. The method uses the pointing device to specify whether an operation performed by the processor in the display in response to the pointing device belongs to a particular subset of such operations. The steps of the method are moving the pointer to an area in the display in which an operation belonging to the subset can be performed and thereupon moving the pointer at a velocity which is greater than a threshold velocity for a distance that is greater than a threshold distance.

The area of the display in which the operation can be performed may include a boundary area that moves to the current pointer location and the threshold velocity and distance may be determined in terms of the boundary area. The direction in which the pointer is moved at a velocity that is greater than the threshold velocity may specify an operation belonging to the particular subset. The method may further include the step of immediately moving the pointer back into the boundary area at a velocity which is greater than the threshold velocity. Additionally, the method may include the step of indicating on the display that an operation belonging to the subset may be performed when the pointer has been moved to the area of the display in which an operation belonging to the subset can be performed.

Other objects and advantages will be apparent to those skilled in the arts to which the invention pertains upon perusal of the following Detailed Description and drawing, wherein:

Figure 2:
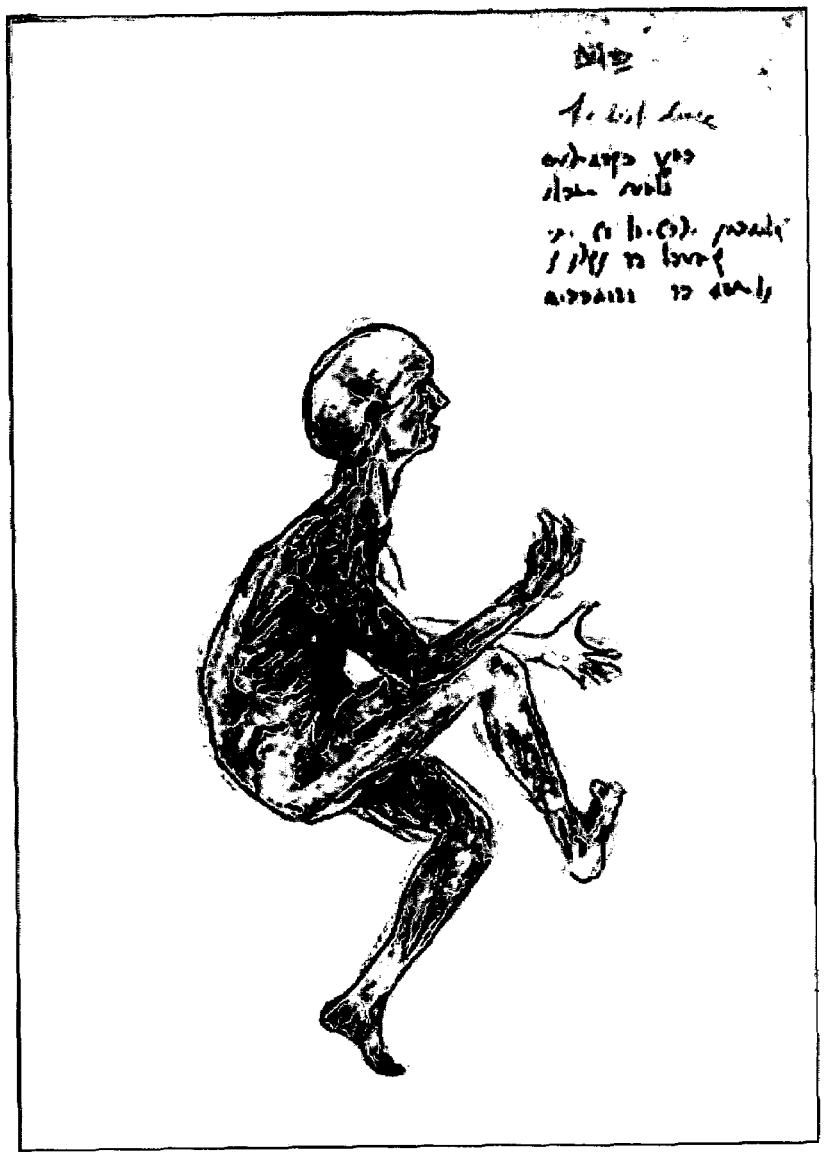
FIG. 2 shows a prior-art technique for solving the switch problem.
Figure 2:
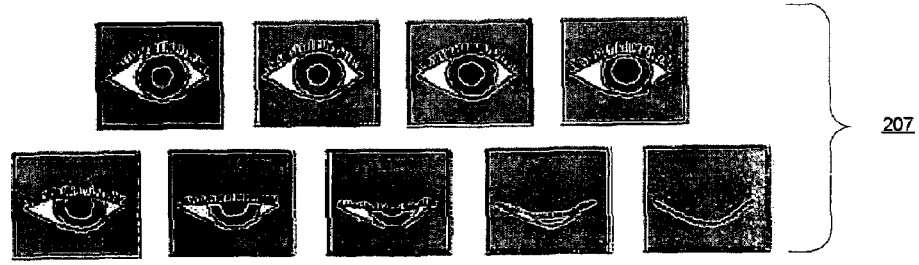

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

General Background

The techniques disclosed herein for using eye movement to interact with objects were developed in the context of making information about artifacts exhibited by museums more available to people who are viewing the artifacts or digital images of the artifacts. This context will be apparent from the examples presented for the techniques, but the techniques are in no way limited to observing museum artifacts but can be used with any interactive device of the type in which the user interacts with a display. In many cases, the display will be a display of a digital image, but it need not be. What is termed a display in the following may be any area or volume in which the eye movements of a viewer of the area may be tracked and interpreted relative to locations in the area or volume.

An application of the techniques which is far removed from observing museum artifacts, but in which the techniques are extremely useful, is manipulation of objects in the heads-up displays that are increasingly being used in equipment such as airplanes or vehicles where an operator must simultaneously keep track of what is going on around him or her, keep track of a wider environment and of the condition of the equipment, and use his or her hands and feet to control the equipment. The heads-up display provides a way of providing the operator with the information he needs concerning the equipment, but because the operator's hands and feet are occupied, the operator has no way of manipulating objects in the heads-up display. Another area in which the techniques are useful is displays for use by surgeons during surgery. Again, the surgeon's hands and feet are not available to manipulate the objects in the display. The techniques described in the following provide users in the situation of the equipment operator or the surgeon with a way of manipulating the objects in the display without using his or her hands or feet to do so.

Using the Gaze to Switch Between the Observational and Operational Modes

The Gaze Generally

In the eye tracking literature a gaze is most often defined as a number of consecutive fixations in a certain area. Human beings intentionally use the gaze in social interactions. Everyone knows what it means to stare at someone or to be stared at by someone or to shift our gaze away when someone is embarrassing us. We also know what it means when someone rolls his or her eyes while describing someone else's opinion. Still another example is indicating in a conversation exactly 'who' is being talked about by repeatedly shifting the gaze in the direction of the person in question. Because human beings naturally distinguish between just looking around and using the gaze in social interaction, it is also natural for them to use the gaze to switch between looking at a display in observational mode and looking at it in intentional mode. The gaze thus provides a solution to the switch problem in pointing devices that track eye movements.

Measuring the Gaze

An eye tracker can easily measure the following characteristics of the gaze:
 the location of the gaze;
 the duration of the gaze; and
 the motion of the gaze, which has two characteristics of its own:
   the direction of gaze movement, and
   the speed of gaze movement.

For technical purposes a gaze movement can be defined as a number of consecutive fixations progressing in the same direction. A gaze movement thus corresponds roughly to longer, straight parts of a scan path and is occasionally referred to as a sweep. The reason for choosing these characteristics is twofold. First, eyes can move much faster than the hand (and there is evidence from literature that eye-pointing is significantly faster than mouse pointing, see Sibert, L. E., Jacob R. J. K. "Evaluation of Eye Gaze Interaction", *Proceedings of the CHI* 2000, ACM, New York, 2000, pp. 281-288, available at: http://citeseer.ni.nec.com/article/sibert00evaluation.html.

The problem addressed here is how to use the above characteristics of the gaze to switch between the observational and intentional modes and to specify operations in the intentional mode. The following Detailed Description will first discuss time-based techniques for switching modes, then location-based techniques for switching modes and specifying actions, and finally action-based techniques for switching modes and specifying actions. In the time-based techniques, what happens in the interaction is determined by the length of time the user's gaze remains on the object. In the location-based techniques, what happens in the interaction is determined by where the user's gaze is directed. In the action-based techniques the interaction is based on the motion of the user's gaze over a gaze-sensitive surface or object.

Figure 3:
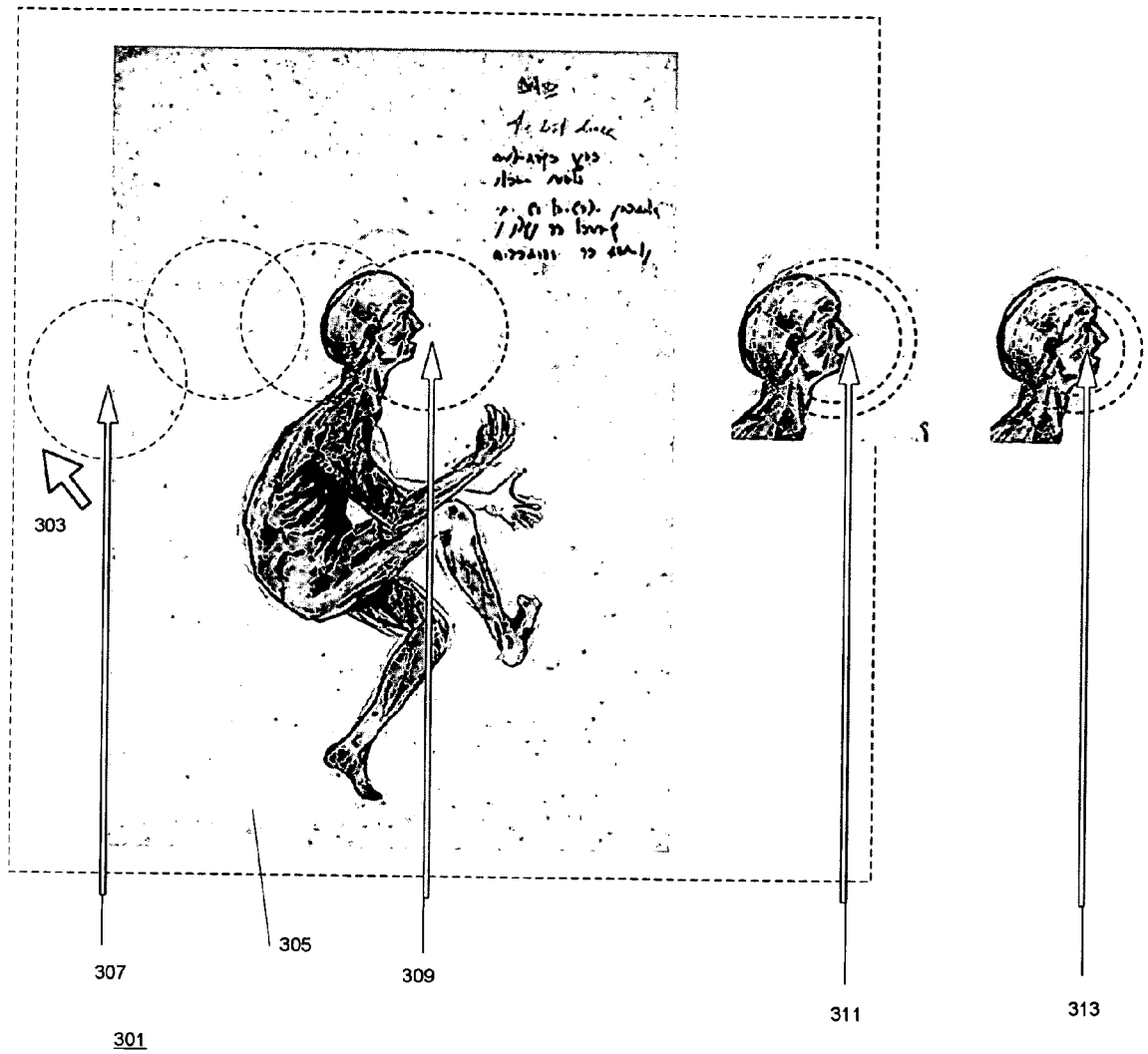
FIG. 3 shows a time-based mode switching technique.
Figure 11:
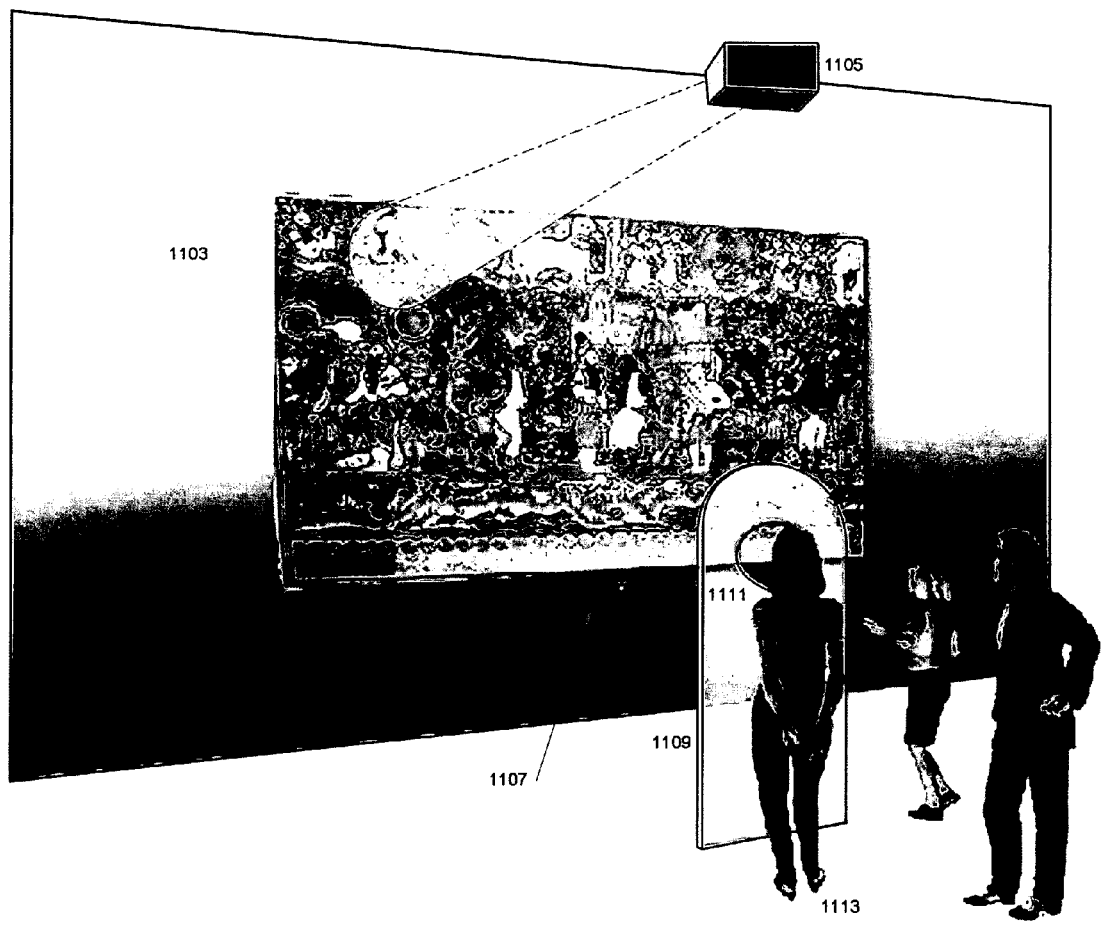
FIG. 11 shows a museum exhibit that employs the techniques of the invention.

Time-Based Techniques for Using the Gaze to Interact with an Object: FIGS. 3 and 11

Figure 1:
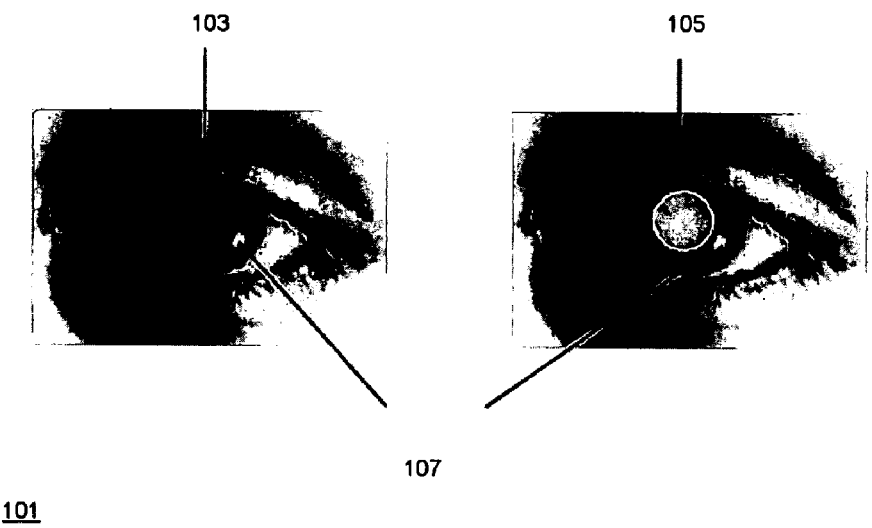
FIG. 1 shows a typical arrangement for capturing eye movement.
Figure 1:
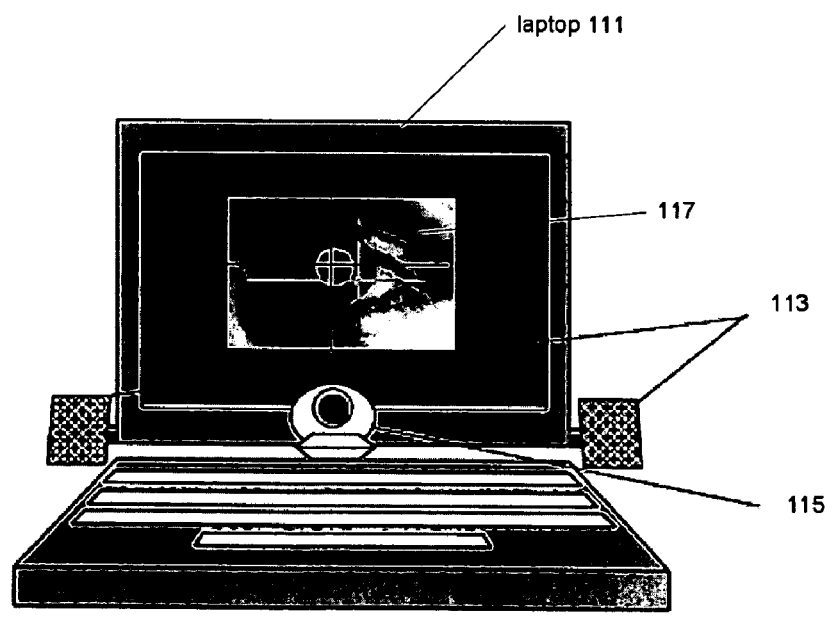

The kind of setup that can be used in the museum context for a gaze-based interaction with a work of art is shown at 1101 in FIG. 11. The work of art in question is a mural 1103 showing scenes from the life of Mahatma Ghandi. A viewer 1113 standing behind position indicator 1109 looks at mural 1109 through opening 1111 in position indicator 109. An eye tracker like the one shown at 109 in FIG. 1 is at 1107; the camera has a telephoto lens. When the user looks at mural 1103 through opening 1111, the user's head is in a position that permits eye tracker 1107 to track the viewer's eye movements. When viewer 1113 directs her eyes to an area of mural 1103, the eye movement information obtained by eye tracker 1107 is used to determine what area of the mural viewer 1113 is looking at, moves movable spotlight 1105 to illuminate that area, and provides the viewer with more information about it.

A setup like that shown in FIG. 11 can be used for the interaction 301 shown in FIG. 3. Interaction 301 employs the duration of the user's gaze to interact with the projection 305 of the painting. Projection 305 is a gaze-sensitive object. As long as pointer 303 is outside projection 305, the pointing device is in observational mode and the pointer retains its traditional arrow form. In other embodiments, the pointer may not be visible in observational mode. When the user shifts his or her gaze to gaze-sensitive object 305, the pointing device changes to navigational mode and the cursor changes its shape to a faint circle indicating that the observed object is gaze sensitive and that the user is looking at it, as shown at 305. Other cursor shapes could be used, but the circle is advantageous because it indicates potential interaction with projection 305 without interfering with the user's observation of projection 305 As long as the viewer continues visual exploration of projection 305, there is no change in status and circle 307 simply follows the user's gaze.

If the viewer decides to focus on a certain area for a predetermined period of time (600 ms in the preferred embodiment), the cursor/circle starts to shrink (zoom) indicating the beginning of the focusing procedure. In FIG. 3, the user begins focusing on the area indicated by 309. The shrinking is shown at 311 (The shrinking circle of course remains at the position of circle 309). If the viewer continues to fixate on the area of interest, the focusing procedure continues for the next 400 milliseconds, ending with a 200 millisecond long signal of imminent action, indicated in the preferred embodiment by the concentric circles shown at 313. The imminent action signal thus indicates that the pointing device is about to change to the operational mode. At any time during the focusing sequence (including after imminent action signal 313) the viewer can return to the observation mode by moving the gaze away from the current fixation point. In the above scenario and as is generally the case for time-based mode switching, there is no way to specify a specific action; it is therefore desirable to have only one pre-specified action relevant to the context of viewing. For example, the action can be that of zooming-in into the observed detail of the painting or proceeding to the next item in the museum collection.

The drawbacks of time-based mode switching are:
 the problem of switching back to the observational mode. This means that the action triggered by focusing on the certain area has to be either self-terminating (as is the case with the 'display the next artifact' action, where the application switches automatically back to the observation mode) or one has to provide a simple mechanism that would allow the viewer to return to the observation mode (for example, by moving his or her gaze outside of the object boundary);
 the problem of choice between multiple actions. Using the time-based mechanism it is possible to trigger off different actions. By changing the cursor/focus shape one can also indicate to the viewer which action is going to take place. However, since the actions are tied to the objects themselves, the viewer essentially has no choice but to accept the pre-specified action. This may not be a problem in a context where pre-specified actions are meaningful and correspond to viewer's expectations.

However, it does limit the number of actions one can 'pack' into an application and can create confusion in cases where two instances of focusing on the same object may trigger off different actions.

the problem of interrupted flow or waiting. Inherent to time-based solutions is the problem that the viewer always has to wait for an action to be executed. After the user has become acquainted with the interaction mechanism, the waiting time becomes subjectively longer (because the user knows what to expect) and often leads to frustration. The problem can be diminished to some extent by progressively shortening the duration of focusing necessary to trigger off the action. However, at some point that can lead to another source of frustration since the viewer may be forced to constantly shift his or her gaze in order to stay in the observation mode.

In spite of the above mentioned problems, time-based gaze interaction can be an effective solution for museum use where longer observation of an area of interest provides the viewer with more information. Another useful approach is to use the gaze direction as input for the delivery of additional information through another modality. In this case, the viewer does not need to get visual feedback related to his/her eye movements (which can be distracting on its own). Instead, focusing on an area of interest may trigger voice narration related to viewer's interest. For an example of this technique in the creation of a gaze-guided interactive narrative see Starker, I., Bolt, R. A. "A gaze-responsive self-disclosing display", in *CHI '90 Proceedings*, ACM, 1990 pp. 3-9

Location-Based Techniques for Using the Gaze to Interact with an Object

Figure 4:
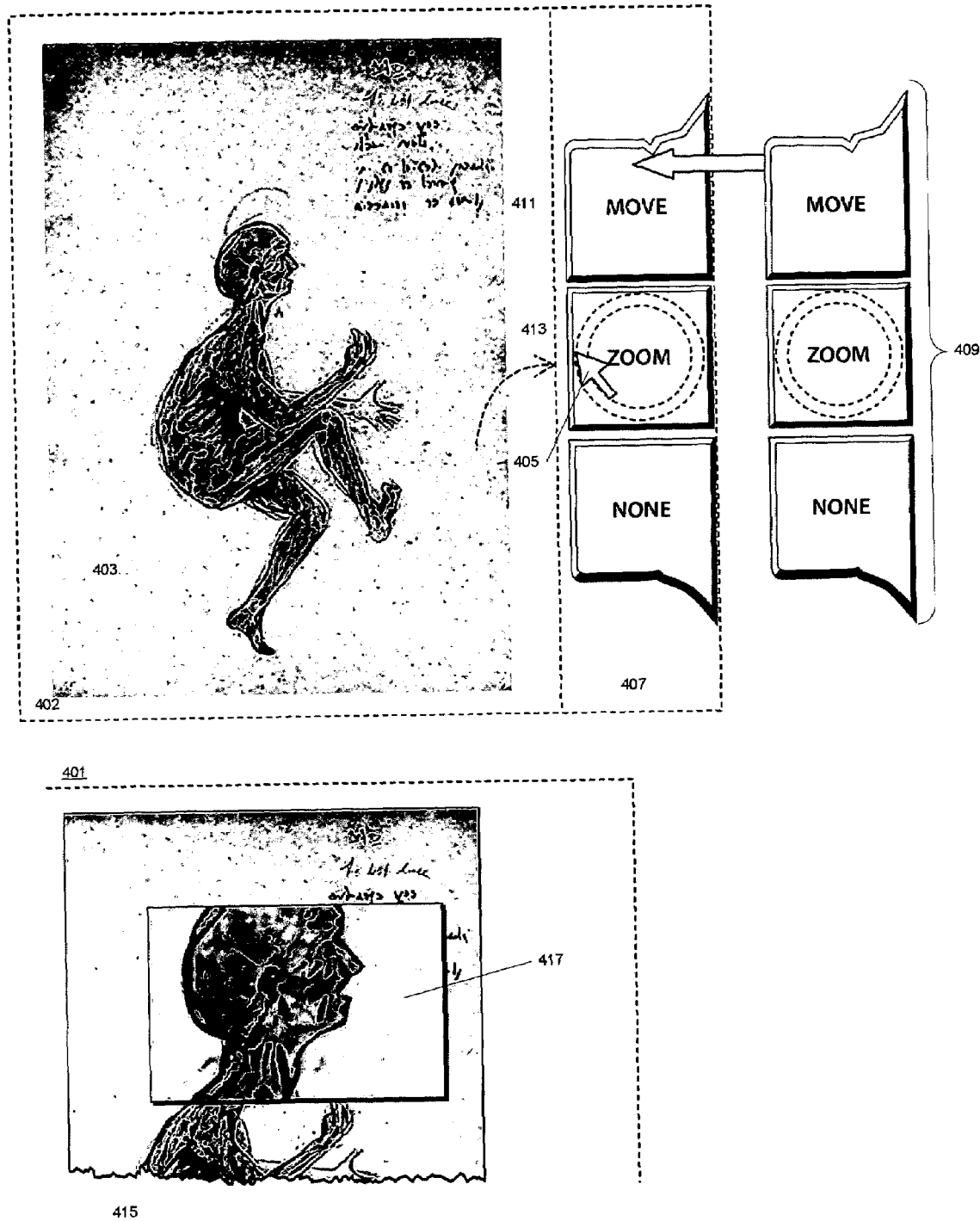
FIG. 4 shows a location-based mode switching technique.

Floating Palettes and Tool Buttons: FIG. 4

Figure 5:
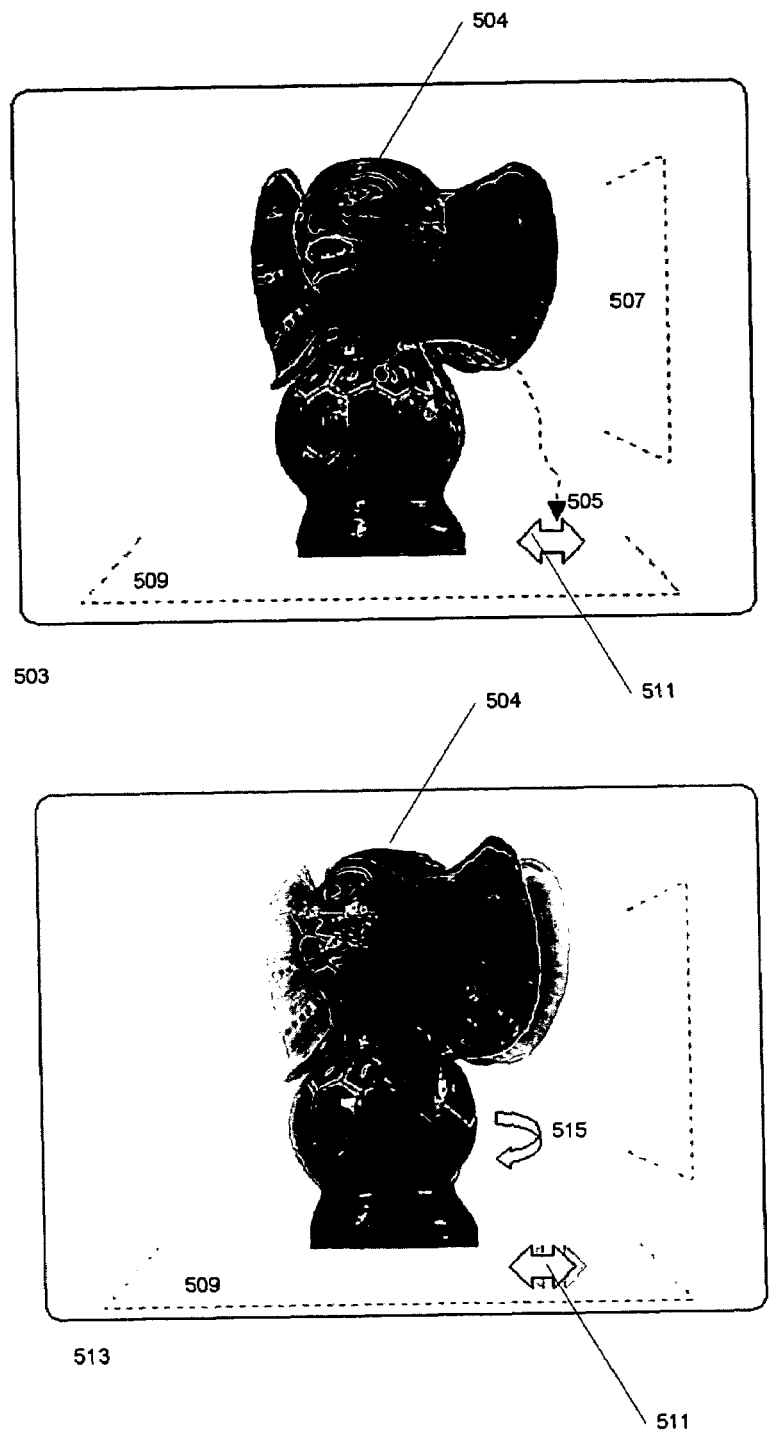
FIG. 5 shows a second location-based switching technique that employs a gaze action.

EyeCon, described in the Description of related technology above, illustrates a traditional way of mode switching: switching between the observational and operational modes is done by using controls that are in the proximity of the area of interest but do not interfere with visual inspection. A technique which improves this approach is illustrated in FIG. 4. As shown at 401, the display with which the user is interacting has two parts: part 402, which is not normally gaze sensitive, and contains a digital image of work of art 403, and part 407, which is always gaze sensitive. When the user moves his or her gaze to part 407, cursor 405 follows and a palette 409 moves into area 407 (in other embodiments, it may simply appear there). Palette 409 contains buttons that indicate operations that can be performed on the image of work of art 403. The operations will of course depend on the context. Here, the operations are move 411, which makes image 403 movable, and zoom 413, which is a zoom tool. When palette 409 is in area 407 and the user moves his gaze onto a button, the gaze is attached to a tool for the operation indicated by the button. In FIG. 5, the user has moved his or her gaze onto zoom button 413 and the button immediately becomes active, as indicated by the appearances of concentric circles on the button. When the user then moves his or her gaze back to area 402, zoom tool 417 moves with the gaze. As shown at 415, zoom tool 417 enlarges the portion of area 402 which is underneath zoom tool 417. There may of course be a number of different palettes, each one with a different set of tools. The palettes may be arranged hierarchically, with a first palette that indicates what palettes are available and the user selecting the desired palette from the first palette or the palettes may be context sensitive. For example, if the user has selected a particular object to be operated on, the palette that appears may be a palette of the operations that are possible on that object.

Active Surfaces: FIG. 5

One can conceptually expand location-based interactions by introducing the concept of an active surface, which is a special kind of gaze-sensitive object. Buttons can be viewed as being essentially single-action gaze-sensitive objects. It really does not matter which part of the button one is focusing on—the outcome is always the same. In contrast, with an active surface, meaning can be assigned to a range of locations, and that in turn makes incremental manipulation of an object possible.

FIG. 5 shows an example of how active surfaces may be used to manipulate an object at 501. Display 503 contains digital image 504 of an artifact. Active surfaces 507 and 509 are discretely marked on the area surrounding the object. Each active surface indicates an area of display 503 in which movement of the user's gaze will result on an operation being performed on image 504. When a user moves his or her gaze so that cursor 505 enters active surface 505, the cursor takes on a shape 511 that indicates the operation performed by movements of the gaze in active surface 505. Here, the operation is rotation of the artifact around the artifact's vertical axis, with the direction and degree of rotation depending on the direction and extent of motion of the gaze in active area 509. The appearance of the cursor is followed by a brief latency period (200-300 ms) during which the viewer can return to the observation mode by moving the gaze outside of the active area. The result of a motion of the gaze to the left in the active area is shown at 513; as shown there, image 504 has rotated to the left, i.e., the movement of the gaze has been incrementally mapped onto the rotation operation.

The advantages of surface-based interaction mechanisms are the introduction of more complex, incremental action sequences into eye movement input and the possibility of rapid shifts between the observation and action modes. The drawback is that the number of actions is limited and that the surfaces, although visually non-intrusive, still claim a substantial portion of the display.

Using Gaze Actions to Interact with an Object

Figure 6:
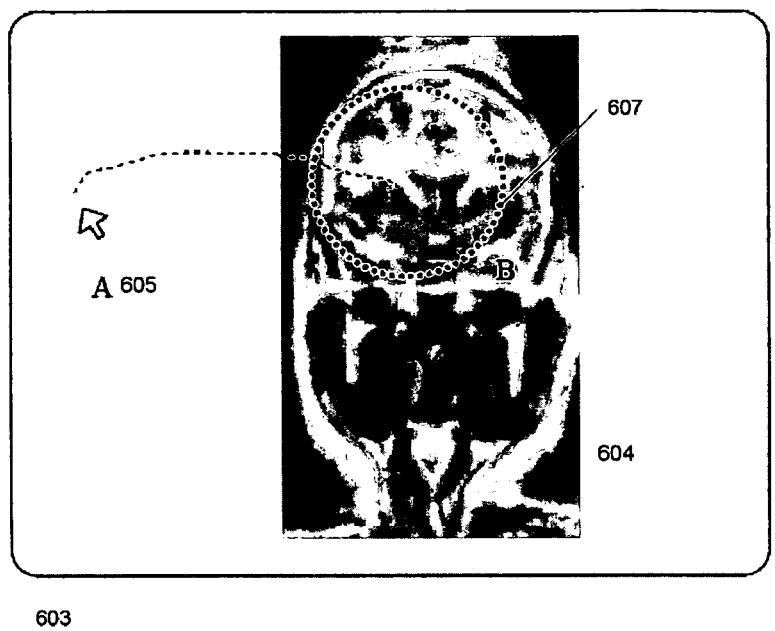
FIG. 6 shows a gaze action-based switching technique.
Figure 6:
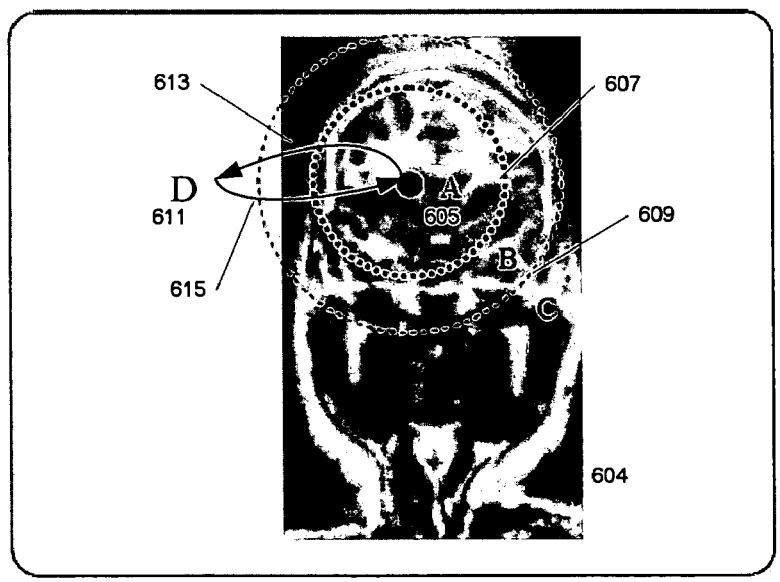
Figure 10:
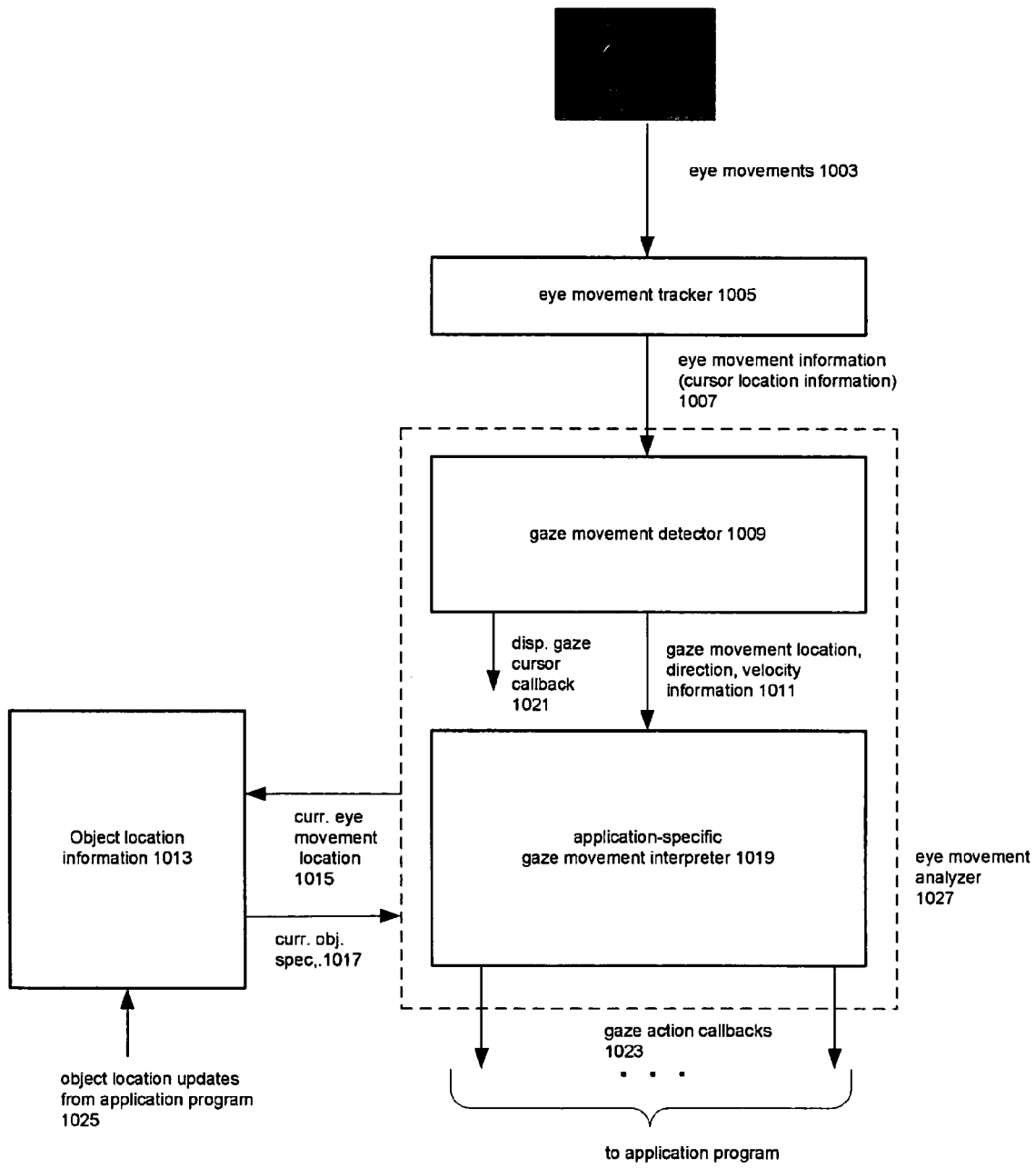
FIG. 10 is a schematic of a pointing device that detects gaze actions.

Gaze Actions Generally: FIGS. 6 and 10

A gaze action is a sequence of or more gaze movements across a gaze-sensitive surface. The movement of the gaze across active surface 505 is a simple example of a gaze action. Each movement of a gaze action has direction and velocity, and gaze actions consisting of sequences of gaze movements can be used to switch between modes and indicate operations on gaze-sensitive objects. Gaze actions made up of any possible sequences of gaze movements can be imagined and the manner in which a system responds to a particular sequence of gaze actions is of course completely programmable.

FIG. 10 is a block diagram of a pointing device 1001 that recognizes gaze actions. Eye movements 1003 are tracked by eye movement tracker 1005, which may be any device capable of tracking eye movements. One such device is eye movement tracker 109 of FIG. 1. Eye movement tracker 1005 produces a record of the eye movements 1007 (generally as a sequence of cursor locations) and provides that record to eye movement analyzer 1027, which analyzes the locations and times to determine whether the eye movements indicate gaze actions.

In one embodiment of eye movement analyzer 1027, the eye movement information 1007 is provided to gaze movement detector 1009, which determines whether the eye movements include gaze movements. If they do, the gaze movement information is provided (1011) to application-specific gaze movement interpreter 1019, which finds gaze movements that indicate gaze actions that are defined for the specific applications. Gaze movement detector 1009 also determines whether the eye movement information indicates that the viewer is looking at a gaze sensitive area of the display. To determine how the eye movements are related to objects in the display, eye movement analyzer 1027 uses the location 1015 of the eye movements it is currently processing to query object location information 1013 to find what object, if any, is at that location. A specifier 1017 for that object is returned to eye movement analyzer 1027. If the object is gaze sensitive, gaze movement detector 1009 indicates in a callback to the application program that a gaze cursor should be displayed on the object (1021).

When gaze movement interpreter 1019 determines that a gaze action involves the object, gaze movement interpreter 1019 provides the object specifier and a specifier for the gaze action as arguments in a callback to the application program that deals with the object. If the application program changes the location of the object, the updated location is provided to object location information 1013 (1025). Of course the components of pointing device may be divided between hardware and software and between generic and application-specific components in various ways. For example, an eye movement tracker 1005 that was optimized for gaze actions might include gaze movement detector 1009 and provide gaze movement information 1011 instead of eye movement information. Further, if gaze actions were standardized across all applications, gaze movement interpreter 1019, too, might be part of tracker 1005.

A particularly advantageous way of defining gaze actions is shown at 601 in FIG. 6. Display 603 contains a gaze sensitive object 604. Pointer 605 A is outside gaze-sensitive object 604 and the pointing device is therefore in observational mode, so pointer A 605 simply follows the movements of the user's eyes. When the user directs his or her gaze to gaze-sensitive object 604, the cursor changes form as shown at circle B 607 to indicate to the user that object 604 is gaze sensitive, that the pointing device is now in navigational mode, and that a gaze action can be used to put the pointing device in operational mode and cause the performance of a specific operation on object 604.

The issue here, as always, is switching to the operational mode. Here, the switching is done by using the velocity and distance of a pair of gaze movements to indicate a gaze action. Velocity and distance are measured as follows in a preferred embodiment: when the user has directed his or her gaze to object 604, the interactive system not only displays circular cursor 607, it also establishes a boundary area around the point at which the user is presently gazing in object 604. In display 608, the boundary area B is within dotted line 609. In a preferred embodiment, the boundary of the boundary area is invisible. As the user's gaze moves, the center of the boundary area moves as well; however, the center of the boundary area moves only at intervals of 50-100 milliseconds. At this point the pointing device is in navigational mode. As long as the user's gaze moves so slowly in object 604 that it stays within boundary area B until boundary area B can again catch up with the current gaze position, the pointing device remains in navigational mode. If the user's gaze simply leaves boundary area B, the pointing device returns to the observational mode; however, if the user rapidly moves his or her gaze out of boundary area B and immediately returns his or her gaze to boundary area B, the user is performing a gaze action and the pointing device switches to operational mode. The gaze action thus has the form shown in FIG. 608: first the gaze moves rapidly from current gaze location 605 to location D 611 which is outside area B, as shown by arrow 613; then the gaze then returns to area B within a short interval (typically 200-400 ms). The operation that will be performed in response to the gaze action is determined by factors such as the direction of the movement from and back to area B and the context in which the movement occurs. Of course, in other embodiments, other techniques for measuring the velocity and distance of a gaze movement may be used.

Using Gaze Actions to Specify Mouse Events

A mouse-driven pointing device works exactly like other pointing devices: the mouse provides a stream of location information and information about the state of its buttons and the application program that is receiving the stream of information interprets the stream.

The stream of information consists of a set of mouse events. The mouse events include:

mouse enter: the mouse has moved the pointer so that the pointer has entered an object in the display mouse leave: the mouse has moved the pointer so that the pointer has left the object it was in.

mouse down: A button on the mouse is held down;

mouse up: A button on the mouse is released;

mouse click: the button is pressed and released within a specific time interval;

mouse double click: the button is pressed and released twice within a specific interval; and mouse move: mouse pointer has moved.

Typical operations using a mouse can be thus described as a series of mouse events. For example, 'dragging and dropping' action would consist of these mouse events: mouse enter+mouse down+mouse move+mouse up.

The gaze action equivalent of mouse enter is gaze enter 703, in which the gaze is moved into a gaze-sensitive object. When that happens, gaze cursor 607 appears in the gaze sensitive object, indicating that the gaze-sensitive object has been selected, boundary area 609 is established, as explained above, and the pointing device is in navigational mode. As long as gaze cursor 607 is displayed, any of the gaze actions 705-727 may be performed on the gaze-sensitive object. Performing the gaze action puts the pointing device into operational mode and causes the operation indicated by the gaze action to be performed.

Gaze up 705 is performed by quickly moving the gaze up and out of boundary area and moving the gaze back into the boundary area (707). This gaze action is equivalent to mouse down and thus can begin a sequence of gaze move events 713. In these events, the gaze (715) is moved in the desired area at a relatively low speed, so that boundary area 609 is able to keep up with the gaze movement and the gaze consequently never passes outside boundary area 609 As the gaze is moved in this manner, the object moves with the gaze. Again, other techniques may be used to determine the speed of movement of the gaze. gaze down 709 is the reverse of gaze up. The gaze is quickly moved down and out of the boundary area and moved back into the boundary area (711). When the gaze down event follows a sequence of gaze move events, the object no longer moves with the gaze. In other embodiments, gaze up 705 may specify a gaze selection operation that selects an object and gaze down 709 may specify a gaze deselect operation that deselects an object. The gaze selection operation can be used to select a set of objects and the gaze deselect may deselect a selected object. Gaze movements 707 are thus equivalent in this embodiment to selecting an object by clicking on it with a mouse and gaze movements 711 are equivalent to deselecting an object by clicking outside the selected object. double gaze up 717 is done by quickly moving the gaze up, out of the boundary area, and back twice in quick succession (719) and can be the equivalent of a mouse double click event.

Figure 7:
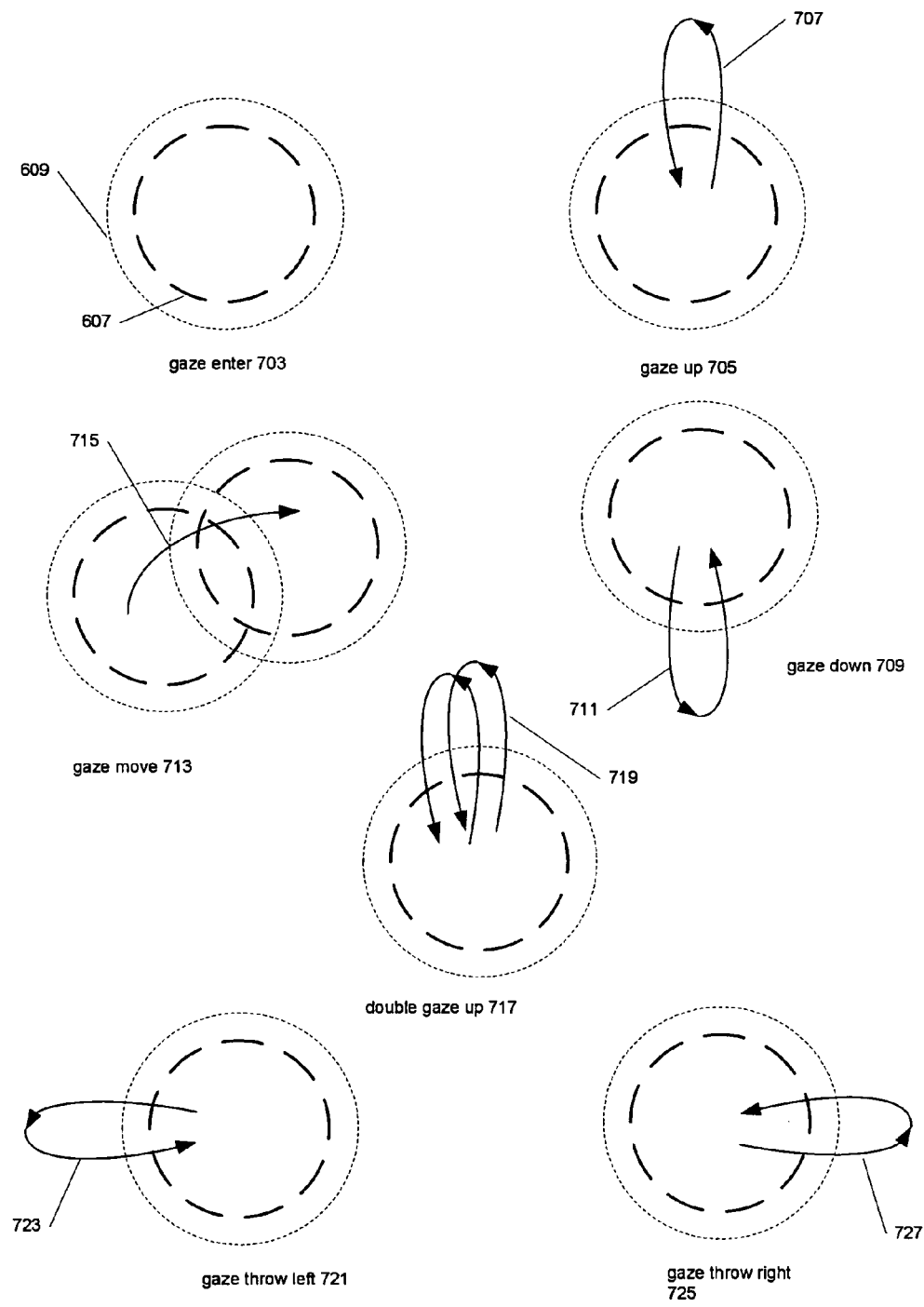
FIG. 7 shows a set of gaze actions that include gaze actions corresponding to standard mouse events.

Two gaze events that do not correspond to standard mouse events are also shown in FIG. 7. These actions are used to remove objects from the display. In gaze throw left 721, the gaze action is a movement of the gaze out of boundary area 609 to the left and back, as shown at 723; the object flies off the display to the left. In gaze throw right 725, the gaze action is the reverse, as shown at 727, and the object flies off the display to the right. In many applications, the object being thrown is one of a list of objects, and the thrown object is replaced in the display by another object on the list. In this case, the direction of the throw may be used to determine the replacement object: with throw left, the object is the previous object on the list; with throw right, it is the next object on the list.

A Taxonomy of Gaze Actions

Gaze Actions on Active Surfaces

The degree of complexity that is required for a gaze action will of course depend on the complexity of the environment in which the action is performed. For example, where the meaning of the gaze action is completely defined by the environment in which the action occurs, as is the case with the active surfaces 507 and 509 of FIG. 5, the gaze action may simply be a single gaze movement in a particular direction across the active surface. In these cases, the active surface performs the function of switching the gaze from the observational to the operational mode. As shown in the example of FIG. 5, in such a situation, the action specified by the gaze may be indicated simply by the fact that the gaze is in an active surface, the direction of the gaze movement in the surface, and the length of the gaze movement. In some situations, only the length of the gaze movement may be of significance.

Gaze Actions Applied Directly to Gaze-Sensitive Objects

Gaze Actions that Use Velocity as a Switch

Where an operation on a gaze sensitive object is to be indicated by applying the gaze action directly to the object being observed, as in the case of grab, drag, and drop operations, there is no active area separate from the object. In this situation, a property of the gaze action itself may indicate the switch in modes. A property that is particularly useful in this regard is the velocity of the gaze movement. In some applications, an operation may be specified simply by a rapid movement of the gaze in a particular direction. For example, a zoom in operation on the gaze sensitive object may be indicated by a rapid movement of the gaze to the left and a zoom out by a rapid movement of the gaze to the right.

Gaze Actions that Use Velocity and Boundary Crossing as a Switch

In many situations, the use of velocity of gaze movement by itself as a switch offers too much opportunity for erroneous interpretations of the user's intent. A rapid gaze movement made for any reason whatever will cause the operation indicated by the rapid gaze movement to occur. A way of reducing the number of such errors is the use of a boundary area, as shown at 609 in FIG. 6. In order for a gaze movement to operate as a switch, the movement must not only be rapid, but must also move outside the boundary area. As shown in FIG. 6, the boundary area is an area that moves with gaze cursor 607. This form of the boundary area is particularly useful with large displays. With small displays, for example those used in cell telephones or PDAs, the boundary area may be the entire display. In order for a gaze movement to be interpreted as a switch, the gaze movement must move beyond the boundaries of the display.

Gaze Actions that Use Velocity, Boundary Crossing, and Return as a Switch

The combination of velocity and boundary crossing is still not sufficient to distinguish between an intent by the user to perform an operation and a simple rapid glance outside the boundary area, perhaps because someone entered the user's cubicle. To distinguish between these cases, the gaze action includes a high velocity return gaze movement that immediately follows the gaze movement that crossed the boundary. The high-velocity return gaze movement returns the gaze to within the boundary area. It is this type of gaze action which is shown in FIGS. 6 and 7.

Designing Gaze Actions

A gaze action is a sequence of one or more gaze movements, and each of the gaze movements may have a direction, a length, and a velocity and may or may not leave a boundary area. As is apparent from the foregoing taxonomy of gaze actions, the more information provided by the environment of a gaze action, the simpler the gaze action can be, down to a gaze action employed in an active area, whose only necessary property is a direction. In an environment such as that provided by the digital display of an image in a museum, the gaze actions will be more complicated, with the ones that manipulate the image typically taking the velocity of a gaze movement as well as its direction and length into account. The highest degree of complexity is offered by GUIs such as those typically used in personal computers, and the gaze actions are correspondingly complex. Thus the gaze actions of FIG. 7 consist of at least two consecutive gaze movements and the direction, length, and velocity of the movement all come into play, as well as the time between the movements.

While direction, length, number, and velocity of gaze movements as well as the times between them can all be used to distinguish one gaze action from another, there are practical limits; for example, more than four directions of motion can be used to indicate an operational gaze action, but ease of use is so greatly reduced that adding additional directions is not worthwhile. Where many gaze actions are needed, the same gaze action can have different meanings that depend on the state of the object the actions are being applied to, with a particular state being marked by a particular appearance of an object.

Figure 8:
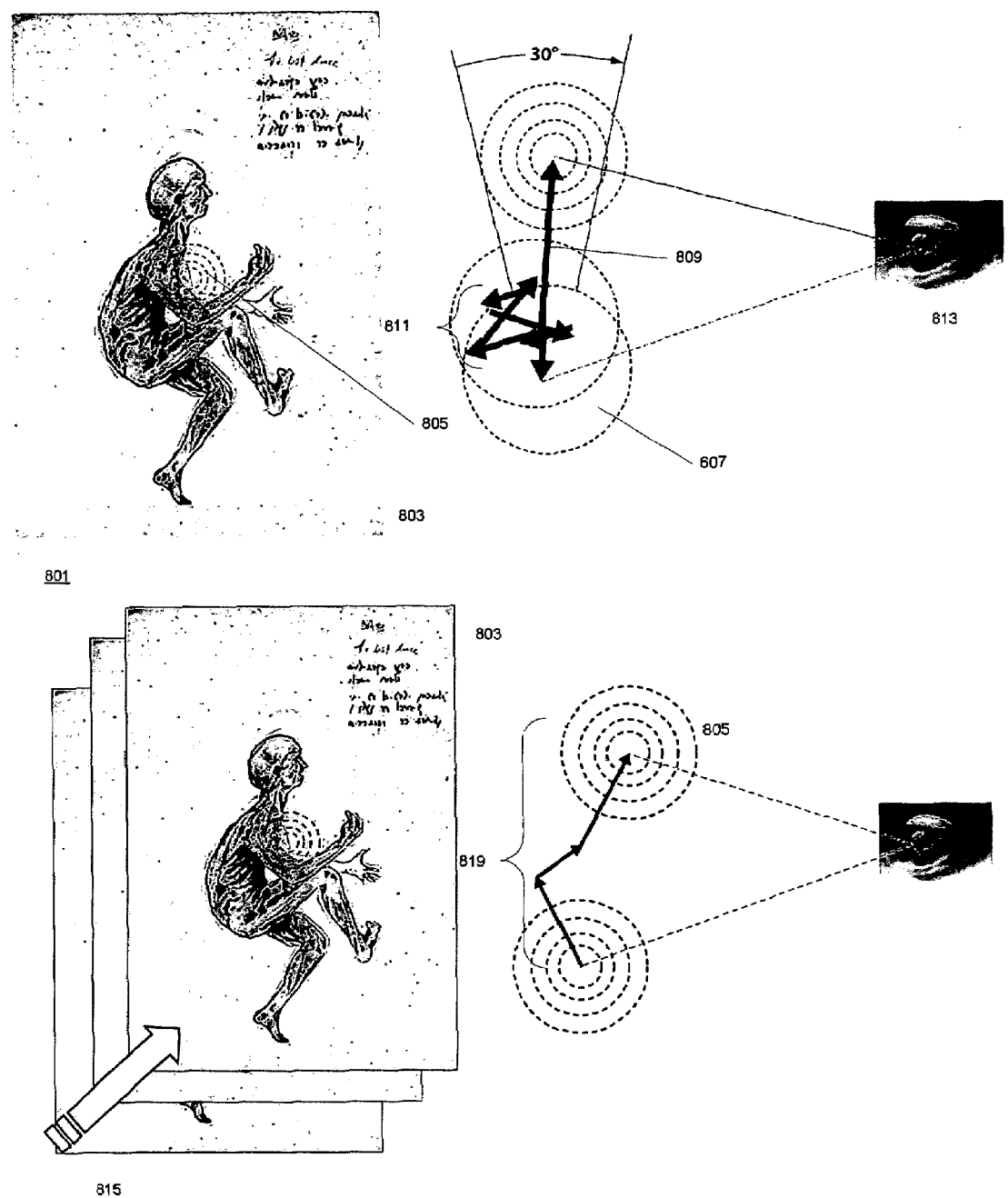
FIG. 8 shows how the grab and drag gaze actions may be used in the museum context.
Figure 9:
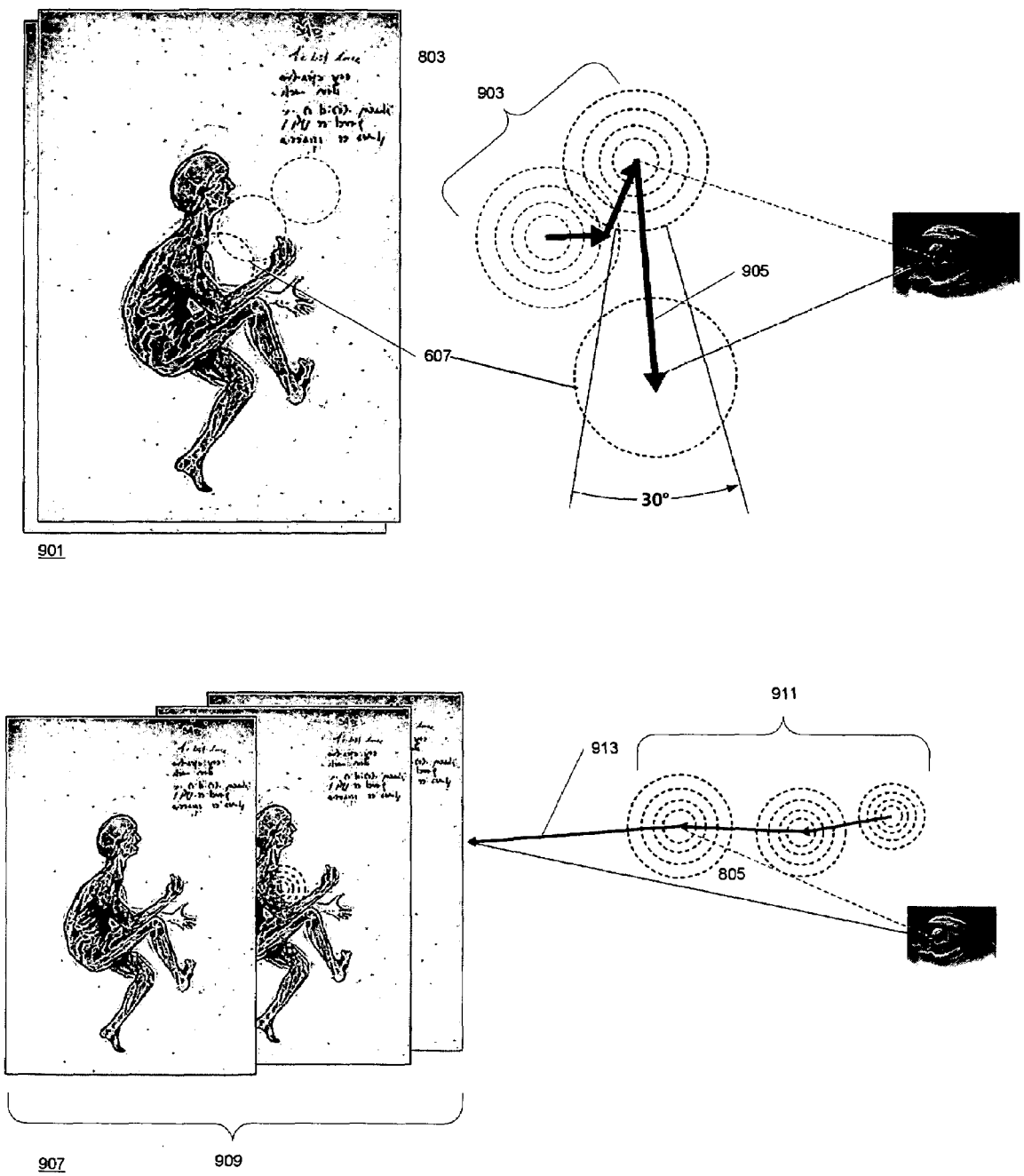
FIG. 9 shows how the drop and throw gaze actions may be used in the museum context.

Using Gaze Actions in the Museum Context: FIGS. 8-9

FIGS. 8 and 9 show a set of gaze actions that are useful in the museum context. Gaze grabbing is shown at 801 in FIG. 8. The action initiated by a sudden upward gaze shift of eyes 813 out of gaze cursor 607, as shown at 809. The action is best described (and subjectively feels like) the act of upward stabbing, or 'hooking' of gaze-sensitive object 803. In a gaze-based interface what happens after the selection of an object will depend on the context of viewing. In the museum context (assuming that the viewers will most often engage in observation of a single artifact), the only action that can be performed on an object may be dragging it, and in this case, object selection is simply a grab operation. Figuratively speaking, the grab operation 'hooks' the object to the end of the viewer's gaze. That the object has been grabbed is indicated by a change of the cursor's shape to that of a target (805). As shown at 811, gaze movements within gaze cursor 607 do not result in a gaze action. Further, the upward gaze movement is defined as any rapid gaze movement which is within 15° of the vertical and which extends beyond the boundary area 609 associated with gaze cursor 607 (not shown).

Gaze dragging is shown at 815 in FIG. 8. Once object 603 has been selected as described above, it will follow the viewer's gaze, as shown at 817 and 819, until it is 'dropped' at another location. Gaze dropping is shown at 901 in FIG. 9. As shown at 903, object 803 follows the user's gaze until the user makes a sudden downward shift of the gaze as shown at 905. The downward gaze movement is defined analogously to the upward movement for gaze selection. After gaze action 905, the object ceases following the user's gaze and target gaze cursor 805 is replaced by ordinary gaze cursor 607, showing that object 803 is no longer being dragged. Gaze dropping is meaningful in cases when the activity involves the repositioning of multiple objects (for example, assembling a puzzle).

In the museum scenario depicted above, gaze throwing is more useful. Gaze throwing, shown at 901 in FIG. 9 is a new interaction mechanism that allows efficient browsing of visual data bases with a variety of input devices, including gaze input. An object that has been previously selected ("hooked") will follow the viewer's gaze as long as the speed of movement does not exceed a certain threshold (905). A quick glance (913) to the left or the right will release the object and it will 'fly away' from the display (909) to be replaced by a new artifact. The objects appear in a sequential order, so if a viewer accidentally throws an object away, it can be recovered by throwing the next object in the opposite direction.

Applying the Principles of Gaze Actions to Other "Buttonless" Pointing Devices

Pointing devices that are driven by eye movements are not the only "buttonless" pointing devices. Another such buttonless pointing device is a transparent touch-sensitive screen that overlays a display. With such a display, the user can move a pointer by placing his or her finger or a mechanical stylus on the screen and moving the finger or mechanical stylus. However, neither the finger nor the mechanical stylus has a button for mode switching, and consequently, this buttonless pointing device has the same switching problem as the pointing device that is driven by eye movements.

The techniques used to solve the switching problem for pointing devices that are driven by eye movements can be applied directly to touch screen pointing devices. Where gaze movements are used with eye movement-driven pointing devices, strokes of the finger or the mechanical stylus can be used with the touch screen. Where objects are gaze sensitive in the displays used with eye movement-driven pointing devices, they are touch sensitive in the displays used with the touch screen. For example, when the user of the touch screen touches a touch sensitive object, a touch cursor like the gaze cursor may occur and may similarly have a boundary area. If the user makes a first quick stroke of the finger up out of the boundary area and a second quick stroke of the finger back into the boundary area, this may similarly indicate a grab touch action, and thereafter the touch-sensitive object will follow the user's finger until the user indicates a drop touch action by making a first quick stroke of the finger down out of the boundary area and a second quick stroke of the finger back into the boundary area. As may be easily seen, there exists for any gaze action an analogous touch action.

CONCLUSION

The foregoing Detailed description has disclosed to those skilled in the relevant technologies how to make and use the inventions described there and has further disclosed the best mode presently known to the inventor of making and using the inventions. As is clear from the Detailed description, gaze movements may be combined to make many different gaze actions and the manner in which a gaze action is interpreted is completely up to the application program for which the gaze action is intended. As is also clear from the Detailed description, a pointing device that employs gaze actions may be constructed using any kind of eye movement tracking device and there are also many ways of dividing the tasks involved in interpreting eye movements as gaze actions between the eye movement tracking device and the processor in which the program for which the gaze action is intended is executing. Similarly, the velocity, direction, and distance of motions of a pointer may be used in many different ways to switch between modes in which a pointing device operates and a pointing device which uses velocity, direction, and distance to switch modes may operate in response to many different kinds of movements by the user.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of interacting with a display, the method comprising the steps performed in a processor of:
   analyzing eye movement information received from an eye movement tracker for a sequence of a plurality of gaze movements, the sequence indicating a gaze action of a set thereof, gaze actions of the set specifying operations on the display; and
   when there is such a sequence, performing the specified operation.

2. The method set forth in claim 1 wherein:
   in the step of analyzing, the analysis is based at least on the location and direction of the gaze movements.

3. The method set forth in claim 2 wherein:
   the operation is incremental; and
   the length of a gaze movement in the gaze action indicates a degree to which the operation is to be performed.

4. The method set forth in claim 3 wherein:
   the operation is further directional; and
   the direction of the gaze movement in the gaze action indicates a direction in which the operation is to be performed.

5. The method set forth in claim 2 wherein:
   the operation is directional; and
   the direction of a gaze movement in the gaze action indicates a direction in which the operation is to be performed.

6. The method set forth in claim 2 wherein:
   the analysis is further based on the velocity of the gaze movements.

7. The method set forth in claim 6 wherein:
   the analysis is further based on the relationship of the gaze movements to a boundary area in the display.

8. The method set forth in claim 1 wherein:
   the operation is on an object in the display.

9. The method set forth in claim 1 wherein:
   the display is produced by the processor.

10. The method set forth in claim 9 wherein:
    the operation is on an object in the display.

11. The method set forth in claim 10 wherein:
    the object belongs to a graphical user interface; and the operation specified by the gaze action is an operation in the graphical user interface.

12. The method set forth in claim 1 wherein the method further includes the step of:
analyzing the eye movement information to determine whether the eyes are directed to a gaze-sensitive area of the display.

13. The method set forth in claim 12 further comprising the step of
when the eye movements are in the gaze sensitive area, changing the appearance of the display to so indicate.

14. The method set forth in claim 13 wherein:
the change of appearance indicates that a gaze action may be performed.

15. The method set forth in claim 13 wherein:
the gaze-sensitive area is occupied by an object in the display; and
the gaze action may be performed on the object.

16. The method set forth in claim 13 wherein
the change of appearance indicates a set of operations that may be performed on the display; and
the method further includes the step of:
when the eye movements indicate selection of one of the operations, performing the selected operation.

17. The method set forth in claim 1 wherein:
there is a subset of the set of operations; and
in the step of analyzing, whether a gaze action specifies an operation belonging to the subset is determined from the velocity of an eye movement in the gaze action.

18. The method set forth in claim 17 wherein:
whether a gaze action specifies an operation belonging to the subset is further determined by whether the eye movement having the velocity leaves a boundary area in the display.

19. The method set forth in claim 18 wherein:
whether a gaze action specifies an operation belonging to the subset is further determined by a further gaze movement which immediately follows the gaze movement having the velocity, also has the velocity, and returns to the boundary area.

20. The method set forth in claim 17 wherein:
the display includes objects; and
the operations in the subset are operations on objects.

21. A pointing device for interacting with a display, the pointing device comprising:
an eye movement tracker which tracks eye movements of a viewer of the display and produces eye movement information therefrom; and
an eye movement analyzer that receives the eye movement information and analyzes the eye movement information for a sequence of a plurality of gaze movements, the sequence indicating a Raze action of a set thereof, gaze actions of the set specifying operations of a set thereof on the display, and,
the pointing device providing a specification of the operation to a processor when there is such a sequence.

22. A method employed in an interactive device having a processor, a display controlled by the processor, and a pointing device to which the processor responds of using the pointing device to specify whether an operation performed by the processor in response to the pointing device belongs to a particular subset of such operations, the pointing device being capable of moving a pointer in the display at varying velocities and
the method comprising the steps of:
moving the pointer to an area in the display in which an operation belonging to the subset can be performed; and
thereupon moving the pointer at a velocity that is greater than a threshold velocity for a distance that is greater than a threshold distance.

23. The method set forth in claim 22 wherein:
the area of the display in which the operation can be performed includes a boundary area that moves to the current pointer location; and
in the step of moving the pointer, the threshold velocity and the threshold distance are determined in terms of the boundary area.

24. The method set forth in claim 23 wherein the method further includes the step of:
immediately moving the pointer back into the boundary area at a velocity which is greater than the threshold velocity.

25. The method set forth in claim 22 wherein:
the direction in which the pointer is moved at a velocity that is greater than the threshold velocity further specifies an operation belonging to the particular subset.

26. The method set forth in claim 22 further comprising the step performed by the processor of:
when the pointer has been moved to the area of the display, indicating on the display that an operation belonging to the subset may be performed.

* * * * *